(12) United States Patent
Mora López et al.

(10) Patent No.: US 10,776,107 B2
(45) Date of Patent: Sep. 15, 2020

(54) MICROSERVICE-BASED DATA PROCESSING APPARATUS, METHOD, AND PROGRAM

(71) Applicant: Fujitsu Limited, Kawasaki-shi, Kanagawa (JP)

(72) Inventors: José Mora López, Madrid (ES); Boris Villazón-Terrazas, Madrid (ES); Manuel Peña Muñoz, Seville (ES); Alejandro Llaves, Madrid (ES); Victor De La Torre, Madrid (ES)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 15/729,952

(22) Filed: Oct. 11, 2017

(65) Prior Publication Data

US 2018/0113707 A1    Apr. 26, 2018

(30) Foreign Application Priority Data

Oct. 21, 2016    (DE) ........................ 10 2016 220 782

(51) Int. Cl.
*G06F 9/22*    (2006.01)
*G06F 9/54*    (2006.01)
*G06F 9/30*    (2018.01)

(52) U.S. Cl.
CPC .............. *G06F 9/223* (2013.01); *G06F 9/226* (2013.01); *G06F 9/3013* (2013.01);
(Continued)

(58) Field of Classification Search
CPC ...... G06F 9/223; G06F 9/226; G06F 9/30123; G06F 9/3013; G06F 9/541; G06F 9/546
See application file for complete search history.

(56) References Cited

U.S. PATENT DOCUMENTS

| 4,068,300 | A  | 1/1978  | Bachman    |
| 6,961,736 | B1 | 11/2005 | Amirghodsi |

(Continued)

FOREIGN PATENT DOCUMENTS

| CA | 2883922   | 3/2015 |
| CN | 101262374 | 9/2008 |

(Continued)

OTHER PUBLICATIONS

US 9,299,346 B1, 03/2016, Hart et al. (withdrawn)
(Continued)

*Primary Examiner* — Doon Y Chow
*Assistant Examiner* — Kimberly L Jordan
(74) *Attorney, Agent, or Firm* — Staas & Halsey LLP

(57) ABSTRACT

A microservice-based data processing apparatus, including: a type register, storing a list of types, a type being a semantic concept expression; and microservices each comprising an annotation of an input type and output types from the list; processing logic transforming input data expressed by the input type into output data expressed by the output types; and a messaging mechanism for inputting data, via a message, to a microservice, the mechanism defining a message format for structuring the messages. The format includes a first field specifying the data being input; and a second field specifying a type, from the list of types, semantically expressing the concept instantiated by the data. Each microservice includes a controller to receive a message from the mechanism having the format, and to respond by executing the logic when the type specified by the second field matches the input type of the microservice.

12 Claims, 3 Drawing Sheets

(52) U.S. Cl.
CPC .......... *G06F 9/30123* (2013.01); *G06F 9/541* (2013.01); *G06F 9/546* (2013.01)

(56) References Cited

U.S. PATENT DOCUMENTS

| | | | |
|---|---|---|---|
| 7,433,835 | B2 | 10/2008 | Frederick et al. |
| 7,584,152 | B2 | 9/2009 | Gupta et al. |
| 7,617,174 | B2 | 11/2009 | Chen et al. |
| 7,734,515 | B1 | 6/2010 | Frederick et al. |
| 7,912,763 | B1 | 3/2011 | Frederick et al. |
| 8,019,652 | B1 | 9/2011 | Frederick et al. |
| 8,019,653 | B1 | 9/2011 | Frederick et al. |
| 8,036,261 | B2 | 10/2011 | Tsutsui et al. |
| 8,312,426 | B2 | 11/2012 | Bouillet et al. |
| 8,391,590 | B2 | 3/2013 | Yalla et al. |
| 8,788,269 | B2 | 7/2014 | Stifelman et al. |
| 9,064,006 | B2 | 6/2015 | Hakkani-Tur et al. |
| 9,268,617 | B1 | 2/2016 | Croteau et al. |
| 9,299,331 | B1 | 3/2016 | Durham et al. |
| 10,120,734 | B1* | 11/2018 | Doraiswamy .......... G06F 9/541 |
| 2002/0083060 | A1 | 6/2002 | Wang et al. |
| 2003/0120830 | A1* | 6/2003 | Iwao ................ G06F 9/465 719/331 |
| 2004/0107821 | A1 | 6/2004 | Alcalde et al. |
| 2005/0060350 | A1 | 3/2005 | Baum et al. |
| 2005/0165656 | A1 | 7/2005 | Frederick |
| 2005/0177372 | A1 | 8/2005 | Wang et al. |
| 2006/0013451 | A1 | 1/2006 | Haitsma |
| 2006/0136428 | A1 | 6/2006 | Syeda-Mahmood |
| 2006/0206883 | A1 | 9/2006 | Sabbouh |
| 2008/0208855 | A1 | 8/2008 | Lingenfelder et al. |
| 2009/0070786 | A1* | 3/2009 | Alves ................ G06F 9/541 719/318 |
| 2009/0277322 | A1 | 11/2009 | Cai et al. |
| 2011/0314375 | A1 | 12/2011 | Zaika et al. |
| 2012/0016678 | A1 | 1/2012 | Gruber et al. |
| 2013/0019285 | A1 | 1/2013 | Barborak et al. |
| 2013/0054244 | A1 | 2/2013 | Bao et al. |
| 2013/0097320 | A1 | 4/2013 | Ritter et al. |
| 2013/0117207 | A1 | 5/2013 | Kim et al. |
| 2013/0144876 | A1 | 6/2013 | Mehanna et al. |
| 2013/0151451 | A1 | 6/2013 | Lee et al. |
| 2013/0275164 | A1 | 10/2013 | Gruber et al. |
| 2013/0311997 | A1 | 11/2013 | Gruber et al. |
| 2014/0149104 | A1 | 5/2014 | Kim et al. |
| 2014/0164539 | A1 | 6/2014 | Mastrangelo et al. |
| 2014/0201629 | A1 | 7/2014 | Heck |
| 2014/0280616 | A1 | 9/2014 | Ramanathan et al. |
| 2014/0310127 | A1 | 10/2014 | Hoch et al. |
| 2014/0337358 | A1 | 11/2014 | Mitra et al. |
| 2014/0337814 | A1 | 11/2014 | Kalns et al. |
| 2014/0344439 | A1 | 11/2014 | Kempf et al. |
| 2014/0365885 | A1 | 12/2014 | Carson et al. |
| 2015/0025875 | A1* | 1/2015 | Perrone .............. G06F 17/2785 704/9 |
| 2015/0207766 | A1* | 7/2015 | Lindner ................ H04L 51/06 709/206 |
| 2015/0245216 | A1 | 8/2015 | Cohen et al. |
| 2015/0271276 | A1 | 9/2015 | Edlund |
| 2015/0348554 | A1 | 12/2015 | Orr et al. |
| 2015/0382079 | A1 | 12/2015 | Lister et al. |
| 2016/0026680 | A1 | 1/2016 | Banerjee et al. |
| 2016/0026913 | A1 | 1/2016 | Moon et al. |
| 2016/0044380 | A1 | 2/2016 | Barrett |
| 2016/0048771 | A1 | 2/2016 | Chen et al. |
| 2016/0062604 | A1 | 3/2016 | Kraljic et al. |
| 2016/0063874 | A1 | 3/2016 | Czerwinski et al. |
| 2016/0063989 | A1 | 3/2016 | Deleeuw |
| 2016/0063998 | A1 | 3/2016 | Krishnamoorthy et al. |
| 2016/0070580 | A1 | 3/2016 | Johnson et al. |
| 2016/0140172 | A1 | 5/2016 | Bornea et al. |
| 2017/0006116 | A1 | 1/2017 | Kelly et al. |

FOREIGN PATENT DOCUMENTS

| | | |
|---|---|---|
| CN | 103038738 | 4/2013 |
| CN | 104202416 | 12/2014 |
| CN | 105164719 | 12/2015 |
| CN | 105357143 | 2/2016 |
| DE | 102012019178 | 4/2013 |
| EP | 1 321 854 | 6/2003 |
| EP | 2325837 | 5/2011 |
| EP | 2618280 | 7/2013 |
| EP | 2704029 | 3/2014 |
| EP | 2894587 | 7/2015 |
| EP | 3041198 | 7/2016 |
| GB | 2495222 | 4/2013 |
| KR | 10-2012-0052610 | 5/2012 |
| KR | 10-2013-0050707 | 5/2013 |
| KR | 10-2013-0064960 | 6/2013 |
| KR | 10-2014-0066640 | 6/2014 |
| TW | 201544974 | 1/2015 |
| TW | 201543243 | 11/2015 |
| TW | 201545559 | 12/2015 |
| WO | 2004/107217 | 12/2004 |
| WO | 2008/015417 | 2/2008 |
| WO | 2015/191965 | 12/2015 |
| WO | 2016/049437 | 3/2016 |
| WO | 2016/105624 | 6/2016 |

OTHER PUBLICATIONS

Extended European Search Report dated Mar. 13, 2018 in corresponding European Patent Application No. 17195348.2, 11 pages.
U.S. Office Action dated Jan. 28, 2019 in U.S. Appl. No. 15/679,296.
Brian X. Chen. "Sid, Alexa and Other Virtual Assistants Put to the Test". In: The New York Times (Jan. 2016). issn: 0362-4331. url: http://www.nytimes.com/2016/01/28/technology/personaltech/siri-alexa-and-other-virtual-assistantsput-to-the-test.html (visited on Apr. 5, 2016).
Janez Demsar et al. "Orange: data mining toolbox in python." In: Journal of Machine Learning Research 14.1 (2013), pp. 2349-2353. url: http://dblp.uni-trier.de/db/journals/jmlr/jmlr14.html#DemsarCEGHMMPTSSUZZZZ13 (visited on Apr. 5, 2016).
Wes McKinney. "pandas: a Foundational Python Library for Data Analysis and Statistics". In: Python for High Performance and Scientific Computing (2011), pp. 1-9. url: http://www.dlr.de/sc/Portaldata/15/Resources/dokumente/pyhpc2011/submissions/pyhpc2011_submission_9.pdf (visited on Apr. 5, 2016).
Wes McKinney. Python for Data Analysis: Data Wrangling with Pandas, NumPy, and IPython. O'Reilly Media, Nov. 2012. isbn: 978-1-4493-1979-3. url: http://www.amazon.ca/exec/obidos/redirect?tag=citeulike09-20&path=ASIN/1449319793 (visited on Apr. 5, 2016).
Khan, Atta R., et al. A Survey of Mobile Cloud Computing Application Models. IEEE Communications Surveys & Tutorials, p. 393-413, 2013. doi:10.1109/SURV.2013.062613.00160.
Daniel Fitzner, Jorg Hoffmann, and Eva Klien. "Functional description of geoprocessing services as conjunctive datalog queries". en. In: GeoInformatica 15.1 (Oct. 2009), pp. 191-221. issn: 1384-6175, 1573-7624. doi: 10.1007/s10707-009-0093-4. url: http://link.springercom/article/10.1007/s10707-009-0093-4 (visited on Mar. 29, 2016).
David Martin et al. "OWL-S: Semantic markup for web services". In: W3C member submission 22 (2004), pp. 2007-2004.
R. Perrey and M. Lycett. "Service-oriented architecture". In: 2003 Symposium on Applications and the Internet Workshops, 2003. Proceedings. Jan. 2003, pp. 116-119. doi: 10.1109/SAINT.2003.1210138.
U.S. Notice of Allowance dated May 22, 2019 in U.S. Appl. No. 15/679,296.
Japanese Office Action dated May 12, 2020 in Japanese Patent Application No. 2016-233526.
Alfio Ferrara, et al., "Automatic Identity Recognition in the Semantic Web", 15 pages.
P. Cornillon, et al., "Opendap: Accessing Data in a Distributed, Heterogeneous Environment" Data Science Journal, vol. 2, Nov. 5, 2003, 11 pages.

(56) References Cited

OTHER PUBLICATIONS

Sebastian Bremm, et al., "Assisted Descriptor Selection Based on Visual Comparative Data Analysis", IEEE Symposium on Visualization 2011, vol. 30, 10 pages.
Avery Li-Chun Wang, "An Industrial-Strength Audio Search Algorithm", 7 pages.
Sabri Boutemedjet, "Unsupervised Feature Selection for Accurate Recommendation of High-Dimensional Image Data" 8 pages.
Christian Drumm et all: "Quickmig", Proceedings of the ACM Sixteenth Conference on Information and Knowledge Anagement (Cikh 2007), Nov. 6-9, 2007, Lisboa Portugal ACM 2 Penn Plaza Suite 701 New York NY 10121-0701 USA, Nov. 6, 2007 (Nov. 6, 2007), pp. 107-116, XP05819291.
Anhai Doan et al: "Reconciling Schemas of Disparate Data Sources: A Machine-Learning Approach", ACM Sigmod 2001, Santa Barbara, CA, USA, May 24, 2001 (May 24, 2001), XP055046420, Retrieved from the Internet: URL:http://reference.kfupm.edu.sa/content/r/e/reconciling schemas of disparate dataso34545.pdf552017/05/10 Search.
Machine Learning Repository, Corel Image Features Data Set, https://archive.ics.uci.edu/ml/datasets/Corel+Image+Features, 3 pages.
TechTC—Technion Repository of Text Categorization Datasets, Maintained by: Evgeniy Gabrilovich, http://techtc.cs.technion.ac.il/, 7 pages.
E. Prud'hommeaux and A. Seaborne, "SPARQL Query Language for RDF," W3C, W3C Recommendation, Jan. 2008.
F. Holzschuher and R. Peinl, "Performance of Graph Query Languages Comparison of Cypher, Gremlin and Native Access in Neo4j," 2013.
J. Mora and O. Corcho, "Engineering Optimisations in Query Rewriting for OBDA," in Proceedings of the 9th International Conference on Semantic Systems, 2013, pp. 41-48.
J. Mora, et al., "Kyrie2: Query Rewriting under Extensional Constraints in \mathcal{ELHIO}," in the Semantic Web ISWC 2014, P. Mika,et al, Eds. Springer International Publishing, 2014, pp. 568-583.
L. Richardson and S. Ruby, RESTful web services—web services for the real world. O'Reilly, 2007.
S. Vinoski, "RESTful Web Services Development Checklist," IEEE Internet Computing, vol. 12, No. 6, pp. 94-96, Nov. 2008.
R. T. Fielding, Architectural Styles and the Design of Network-based Software Architectures. 2000.
M. zur Muehlen, J. V. Nickerson, and K. D. Swenson, "Developing web services choreography standards—the case of REST vs. SOAP." Decision Support Systems, vol. 40, No. 1, pp. 9-29, 2005.
M. Arenas, A. Bertails, E. Prud'hommeaux, and J. Sequeda, "A Direct Mapping of Relational Data to RDF," 2012.
S. Thakkar, J. L. Ambite, and C. A. Knoblock, "Composing, optimizing, and executing plans for bioinformatics web services," the VLDB Journal, vol. 14, No. 3, pp. 330-353, Sep. 2005.
Martin Abadi et al. "TensorFlow: Large-Scale Machine Learning on Heterogeneous Distributed Systems". In: arXiv:1603.04467 [cs] (Mar. 2016). arXiv: 1603.04467. url: http://arxiv.org/abs/ 1603.04467 (visited on Apr. 5, 2016).
Soheil Bahrampour et al. "Comparative Study of Caffe, Neon, Theano, and Torch for Deep Learning." In: CoRR abs/1511.06435 (2015). url: http://dblp.uni-trier.de/db/journals/corr/corr1511.html#BahrampourRSS15 (visited on Apr. 5, 2016).
Lynsey Barber. This is why the world needs a Facebook virtual assistant. Aug. 2015. url: http://www.cityam.com/223196/ why-world-needs-facebook-m-its-new-ai-and-peoplepowered-virtual-personal-assistant-messenger (visited on Apr. 5, 2016).
James Bergstra et al. "Theano: Deep learning on gpus with python". In: NIPS 2011, BigLearning Workshop, Granada, Spain. 2011. url: http://biglearn.org/2011/files/papers/biglearn2011_submission_18.pdf (visited on Apr. 5, 2016).
Brian X. Chen. "Siri, Alexa and Other Virtual Assistants Put to the Test". In: the New York Times (Jan. 2016). issn: 0362-4331. url: http://www.nytimes.com/2016/01/28/technology/personaltech/siri-alexa-and-other-virtual-assistantsput-to-the-test.html (visited on Apr. 5, 2016).
Gianmarco De Francisci Morales and Albert Bifet. "Samoa: Scalable advanced massive online analysis". In: The Journal of Machine Learning Research 16.1 (2015), pp. 149153. url: http://dl.acm.org/citation.cfm?id=2789277 (visited on Apr. 5, 2016).
Janez Demsar et al. "Orange: data mining toolbox in python." in: Journal of Machine Learning Research 14.1 (2013), pp. 2349-2353. url: http://dblp.uni-trierde/db/journals/jmlrimlr14.html#DemsarCEGHMMPTSSUZZZZ13 (visited on Apr. 5, 2016).
A. Ghoting et al. "SystemML: Declarative machine learning on MapReduce". In: 2011 IEEE 27th International Conference on Data Engineering (ICDE). Apr. 2011, pp. 231-242. doi: 10.1109/ICDE.2011.5767930.
Yangqing Jia et al. "Caffe: Convolutional Architecture for Fast Feature Embedding". In: Proceedings of the 22Nd ACM International Conference on Multimedia. Mm '14. New York, NY, USA: ACM, 2014, pp. 675-678. isbn: 978-1-4503-3063-3. doi: 10.1145/2647868.2654889. url: http://doi.acm.org/10.1145/2647868.2654889 (visited on Apr. 5, 2016).
Eric Jones, Travis Oliphant, and Pearu Peterson. "SciPy: Open source scientific tools for Python". In: (2001). url: http://www.scipy.org (visited on Apr. 5, 2016).
Supun Kamburugamuve et al. Survey of distributed stream processing for large stream sources. Tech. rep. Technical report. 2013. Available at http://grids. ucs. indiana.edu/ptliupages/publications/survey stream proc essing. pdf, 2013. url: https://www.sics.se/~amir/files/download/dic/2013%20%20Survey%20of%20Distributed%20Stream%20Processing%20for%20Large%20Stream%20Sources.pdf (visited on Apr. 5, 2016).
Heather Kelly. Which is the best digital assistant: Siri, Cortana, Alexa or Google Now? Jul. 2015. url: http://money.cnn. com/2015/07/28/technology/digital-assistant-interview/ index.html (visited on Apr. 5, 2016).
Marc Kohlbrugge. An email app Don Draper would use. Apr. 2014. url: https://medium.com/©marckohlbrugge/an-email-appdon-draper-would-use-1bccaf2b55b7 (visited on Apr. 5, 2016).
Ingrid Lunden. X.ai Lands $2.1 M to Build 'Amy', An Al-Powered Personal Assistant for Meetings. 2014. url: http://social. techcrunch.com/2014/05/21/x-ai-lands-2m-to-build-amyan-ai-powered-personal-assistant-for-meetings/ (visited on Apr. 5, 2016).
Wes McKinney. "pandas: a Foundational Python Library for Data Analysis and Statistics". In: Python for High Performance and Scientific Computing (2011), pp. 1-9. url: http://www.dlrde/sc/Portaldata/15/Resources/dokumente/pyhpc2011/submissions/pyhpc2011_submission_9.pdf (visited on Apr. 5, 2016).
Wes McKinney. Python for Data Analysis: Data Wrangling with Pandas, NumPy, and IPython. O'Reilly Media, Nov. 2012. isbn: 978-Jan. 4493-1979-3. url: http://www.amazon.ca/exec/obidos/ red i rect?tag=citeu li ke09-20&path=Asin/1449319793 (visited on Apr. 5, 2016).
Joanne Mcneil. "Why Do I Have to Call This App 'Julie'?" in: the New York Times (Dec. 2015). issn: 0362-4331. url: http://www.nytimes.com/2015/12/20/opinion/sunday/why-do-ihave-to-call-this-app-julie.html (visited on Apr. 5, 2016).
Dharmendra S. Modha et al. "Cognitive Computing". In: Commun. Acm 54.8 (Aug. 2011), pp. 62-71. issn: 0001-0782. doi: 10.1145/1978542.1978559. url: http://doi.acm.org/10.1145/1978542. 1978559 (visited on Apr. 1, 2016).
Sean Owen et al. Mahout in Action. Greenwich, CT, USA: Manning Publications Co., 2011. isbn: 978-1-935182-68-9.
Fabian Pedregosa. "Scikit-learn: Machine Learning in Python". In: (2011). url: http://arxiv.org/abs/1201.0490 (visited on Apr. 5, 2016).
Fernando Perez and Brian E. Granger. "IPython: A System for Interactive Scientific Computing". In: Computing in Science & Engineering 9.3 (May 2007), pp. 21-29. issn: 1521-9615. doi: 10.1109/MCSE.2007.53. url: http://scitation.aip.org/content/ aip/journal/cise/9/3/10.1109/MCSE.2007.53 (visited on Apr. 5, 2016).
Abdul Ghaffar Shoro and Tariq Rahim Soomro. "Big Data Analysis: Apache Spark Perspective". In: Global Journal of Computer Sci-

(56) References Cited

OTHER PUBLICATIONS ence and Technology 15.1 (Feb. 2015). issn: 0975-4172. url: http://www.computerresearch.org/index.php/computer/article/view/1137 (visited on Apr. 5, 2016).
Rajendra Kumar Shukla, Pooja Pandey, and Vinod Kumar. "Big data frameworks: at a glance". In: Int. J. Innovations Adv. Comput. Sci. IJACS 4.1 (2015), pp. 169-175. url: http://academicscience.co.In/admin/resources/project/paper/f201501301422607618.pdf (visited on Apr. 5, 2016).
Mark Summerfield. Python 3. Ed. By Wydawnictwo Helion. 2010.
Tom White. Hadoop: the Definitive Guide. en. "O'Reilly Media, Inc.", May 2012. isbn: 978-1-4493-1152-0.
Khan, Atta R., et al. A Survey of Mobile Cloud Computing Application Models. IEEE Communications Surveys & Tutorials, pp. 393-413, 2013. doi:10.1109/SURV.2013.062613.00160.
Jon Ison, et al. 2016. "Tools and Data Services Registry: A Community Effort to Document Bioinformatics Resources." Nucleic Acids Research 44 (D1): D38-D47. doi:10.1093/nar/gkv1116.
Maleshkova, Maria, Carlos Pedrinaci, and John Domingue. 2009. "Supporting the Creation of Semantic RESTful Service Descriptions." in. Washington D.C., USA. http://oro.open.ac.uk/23106/.
Kutter M: SOAP-WSDL-1.27. On the Internet <URL>http://search.cpan.org/~mkutter/SOAP-WSDL-1.27/lib/SOAP/WSDL.pmzw. <http://web.archive.org/web/20150130084326/http://search.cpan.org/-mkutter/SOAP-WSDL-1.27/lib/SOAP/WSDLpm>.
Rama Akkiraju et al. "Web Service Semantics—WSDL-S". In: Kno.e.sis Publications (Apr. 2005). url: http://corescholar.libraries.wright.edu/knoesis/69.
David Chappell. Enterprise Service Bus. en. "O'Reilly Media, Inc.", Jun. 2004. isbn: 978- 0-596-00675-4.
Erik Christensen et al. Web Services Description Language (WSDL) version W3C Note Mar. 15, 2001. url: http://www.w3.org/TR.wsdl (visited on Mar. 14, 2016).
F. Curbera et al. "Unraveling the Web services web: an introduction to SOAP, WSDL, and UDDI". In: IEEE Internet Computing 6.2 (Mar. 2002), pp. 86-93. issn: 1089-7801. doi: 10.1109/4236.991449.
Keir Davis, John W. Turner, and Nathan Yocom. "Client-Server Architecture". en. In: the Definitive Guide to Linux Network Programming. DOI: 10.1007/978-1-4302-0748-1 5. Apress, 2004, pp. 99- 135. isbn: 978-1-59059-322-6 978-1-4302-0748-1. url: http://link.springercom/chapter/10.1007/978-1-4302-0748-1 5 (visited on Mar. 14, 2016).
Daniel Fitzner, Jorg Hoffmann, and Eva Klien. "Functional description of geoprocessing services as conjunctive datalog queries". en. In: GeoInformatica 15.1 (Oct. 2009), pp. 191-221. issn: 1384-6175, 1573-7624. doi: 10.1007/s10707-009-0093-4. url: http://link.springercom/article/10.1007/s10707-009-0093-4 (visited on Mar. 29, 2016).
Martin Hofmann. "Syntax and semantics of dependent types". en. In: Extensional Constructs in Intensional Type Theory. Cphc/Bcs Distinguished Dissertations. DOI: 10.1007/978-1-4471-0963-1 2. Springer London, 1997, pp. 13-54. isbn: 978-1-44711243-3 978-1-4471-0963-1. url: http://link.springercom/chapter/10.1007/978-14471-0963-1_2 (visited on Mar. 14, 2016).
J. Kopecky, K. Gomadam, and T. Vitvar. "hRESTS: An HTML Microformat for Describing RESTful Web Services". In: IEEE/WIC/ACM International Conference on Web Intelligence and Intelligent Agent Technology, 2008. WI-IAT '08. vol. 1. Dec. 2008, pp. 619-625. doi:10.1109/WIIAT.2008.379.

Jacek Kopecky. Web Services Description Language (WSDL) Version 2.0: RDF Mapping. Published: World Wide Web Consortium, Note NOTE-wsdl20-rdf-20070626. Jun. 2007.
Kathryn B. Laskey and Kenneth Laskey. "Service oriented architecture". en. In: Wiley Interdisciplinary Reviews: Computational Statistics 1.1 (Jul. 2009), pp. 101-105. issn: 1939-0068. doi: 10.1002/wics.8. url: http://onlinelibrary.wiley.com/doi/10. 1002/wics.8/abstract (visited on Mar. 14, 2016).
David Martin et al. "OWL-S: Semantic markup for web services". In: W3C member submission 22 (2004), pp. 2007-04.
Sam Newman. Building Microservices. en. "O'Reilly Media, Inc.", Feb. 2015. isbn: 978-1-4919-5033-3.
Carlos Pedrinaci et al. "Adaptive Service Binding with Lightweight Semantic Web Services". en. In: Service Engineering. DOI: 10.1007/978-3-7091-0415-6 9. Springer Vienna, 2011, pp. 233-260. isbn: 9783-7091-0414-9 978-3-7091-0415-6. url: http://link.springer.com/chapter/10.1007/978-3-7091-0415-6_9 (visited on Mar. 30, 2016).
R. Perrey and M. Lycett. "Service-oriented architecture". In: 2003 Symposium on Applications and the Internet Workshops, 2003. Proceedings. Jan. 2003, pp. 116-119. doi: 10.1109/SAINTW.2003. 1210138.
Amit Sheth, Karthik Gomadam, and Ajith Ranabahu. "Semantics Enhanced Services: METEOR-S, SAWSDL and SA-REST". In: Bulletin of the Technical Committee on Data Engineering (Sep. 2008), pp. 8-12. url: http://corescholar.libraries.wright.edu/knoesis/635.
J. Thones. "Microservices". In: IEEE Software 32.1 (Jan. 2015), pp. 116-116. issn: 0740-7459. doi: 10.1109/MS.2015.11.
Tomas Vitvar et al. "WSMO-Lite Annotations for Web Services". en. In: the Semantic Web: Research and Applications. Ed. by Sean Bechhofer et al. Lecture Notes in Computer Science 5021. DOI: 10.1007/978-3-540-68234-9 49. Springer Berlin Heidelberg, Jun. 2008, pp. 674-689. isbn: 978-3-540-68233-2 978-3-540-68234-9. url: http: //link.springercom/chapter/10.1007/978-3-540-682349_ 49 (visited on Mar. 30, 2016).
H. Q. Yu et al. "Developing RDF-based Web Services for supporting runtime matchmaking and invocation". In: 2011 7th International Conference on Next Generation Web Services Practices (NWeSP). Oct. 2011, pp. 392-397. doi: 10.1109/NWeSP.2011.6088211.
Siddiqui, M., Villazon, A.,Fahringer, T.: Semantic-based on-demand synthesis of grid activities for automatic workflow generation. In: Proceedings of the Third IEEE International Conference on e-Science and Grid Computing, E-Science 2007, pp. 4350. IEEE Computer Society, Washington, DC, USA (2007).
Badica, Costin; Braubach, Lars; Paschke, Adrian. Rule-based distributed and agent systems. Rule-Based Reasoning, Programming, and Applications, 2011, pp. 3-28.
German Search Report dated Jul. 17, 2017 in German Patent Application No. 102016220777.6.
German Search Report dated Aug. 2, 2017 in German Patent Application No. 102016220778.4.
German Search Report dated Aug. 9, 2017 in German Patent Application No. 102016220782.2
Extended European Search Report dated May 10, 2017 in European Patent Application No. 16205543.8.
Extended European Search Report dated Jul. 4, 2017 in European Patent Application No. 16204653.6.
Extended European Search Report dated Aug. 17, 2017 in European Patent Application No. 16206620.3.
Abstract of IN7309DEN2014, published Apr. 24, 2015.
Machine Translation of IN359CH2013, published Aug. 7, 2015.

* cited by examiner

MICROSERVICE-BASED DATA PROCESSING APPARATUS, METHOD, AND PROGRAM

CROSS-REFERENCE TO RELATED APPLICATIONS

This application claims the benefit of German Application No. 102016220782.2, filed Oct. 21, 2017, in the German Intellectual Property Office, the disclosure of which is incorporated herein by reference.

BACKGROUND

1. Field

The embodiments discussed herein are in the field of data processing, and specifically relates to microservice data processing architectures.

2. Description of the Related Art

Microservices are ways of breaking large data processing operations into loosely coupled modules. Individual modules are responsible for highly defined and discrete tasks and communicate with other modules through simple, universally accessible application program interfaces (APIs).

As opposed to more monolithic design structures, microservices (1) improve fault isolation, (2) eliminate long-term commitment to a single technology stack, and (3) make it easier for a new developer to understand the functionality of a service.

However, the microservices architecture has some drawbacks:

Developing distributed systems can be complex;

Multiple databases and transaction management is difficult;

Testing a microservices-based application can be cumbersome;

Deploying microservices can be complex;

Laborious configuration management;

Keeping dependent services compatible when updating a single service is difficult;

Unsafe distributed communication.

Consequently, creating solutions that overcome some of those drawbacks will improve the efficiency and desirability of a microservice-based system.

SUMMARY

Additional aspects and/or advantages will be set forth in part in the description which follows and, in part, will be apparent from the description, or may be learned by practice of the embodiments.

Embodiments of one aspect of the embodiments include a microservice-based data processing apparatus, comprising: a type register, storing a list of types, a type being a semantic expression of a concept instantiated by data in the apparatus; and a plurality of microservices. Each microservice comprises: an annotation of an input type from the stored list of types and one or more output types from the stored list of types; processing logic which, when executed, by a processor, transforms input data instantiating the concept semantically expressed by the input type into output data instantiating the concept semantically expressed by one of the one or more output types. The apparatus further comprises a messaging mechanism for inputting data, via a message, to a microservice among the plurality of microservices, the messaging mechanism defining a message format according to which the messages are structured. The messaging format comprises a first field specifying the data being input; and a second field specifying a type, from the stored list of types, semantically expressing the concept instantiated by the data of the first field. Each microservice further comprises: a controller, the controller being configured to receive a message from the messaging mechanism structured according to the messaging format, and to respond by executing the processing logic of the microservice on condition of the type specified by the second field of the received message matching the input type of the annotation of the microservice.

The annotation of the microservices by dependent type, coupled with a messaging format which leverages the dependent types to represent data being transferred by the message, provides a system for automated orchestration of microservices that is fast, easy, and results in an accurately interconnected system of microservices.

Embodiments orchestrate microservices based on dependent types, working as annotations of the microservices. These annotations provide semantic information sufficient to enable automatic orchestration of microservices, without placing too high a burden on the microservice designer.

The stored list of types provides a simple to implement validation mechanism for microservice annotations.

A microservice is an atomic service in a data processing apparatus. Atomic in this context means single responsibility or single function. A microservice is distinguished from a generic web service by the dimension of service. For example, a generic web service would include some form of authentication as part of a wider functionality. In a microservice-based apparatus, authentication is a dedicated microservice.

The apparatus is, for example, a web server or network of interconnected web servers. Such a web server or network of web servers provides a data processing service to clients/users over the internet.

A type is a semantic expression of a concept instantiated by data in the apparatus. A type may also be referred to as a data type. The type specified in the annotation of a microservice, and the type specified in messages structured according to the messaging format, are dependent types. A dependent type is a data type that establishes some constraints in the values that it may represent. The dependency is the constraint that the type be from the list of stored types.

The list of stored types is a semantic model of data in the apparatus. Data input to the apparatus (as a data processing request), data output by the apparatus (in response to the data processing request), and intermediate data (i.e. intermediate between input data and output data), instantiates concepts expressed in the semantic model. A semantic expression is one or more words whose semantics represent a concept. Data instantiates a concept by representing a value or range of values from among those values by which the concept is representable.

The microservice may be a processor (CPU) for executing processing logic, and a memory for storing the processing logic, and for storing data being processed. The controller may also be realized by processing logic stored in the memory and which is executed by the processor.

Optionally, the messaging format also includes: a third field specifying one or more types, from the stored list of types, of requested output data; wherein the messaging mechanism is configured to distribute a message output to the messaging mechanism and structured according to the message format to each microservice for which one of the one or more output types of the annotation matches one of the one or more types specified by the third field of the message; and wherein, the controller of each microservice is configured, on condition of the type specified by the second field of the received message not matching the input type of the annotation, to modify the message by adding the input type of the annotation of the microservice to the third field of the message, and to output the modified message for transmission via the messaging mechanism.

The messaging mechanism is, for example, a bus connection between the plurality of microservices to which messages are transmitted, and which implements stored rules for the distribution of messages transmitted to the messaging mechanism among the microservices. That is to say, by virtue of the system of annotations (leveraged by the microservice controllers) and the message format, messages need not be targeted to a particular microservice in order to realize a chain processing by plural microservices.

Advantageously, orchestration of microservices (that is, triggering of plural microservices in a particular order in order to fulfill a request for data processing) in an automated manner is enabled by the system of message format, messaging mechanism, and annotations. The message (which can be considered to be a manifestation of a request for data processing) is first distributed to microservices that can provide the requested output. Then, if those microservices require an input other than the input specified in the message, a new message (i.e. request for data processing) is generated requesting the required input. The procedure iterates backward until a microservice can provide (as indicated by its annotation) an output specified by a message with the input specified by the message. Conceptually, in a chain of microservices required to provide a data processing service, messages are propagated finish-to-start, and processing occurs start-to-finish.

For example, the third field is a stack. In other words, an order in which types are added to the third field is preserved in the third field of the message. In such embodiments, the messaging mechanism is configured to distribute a message output to the messaging mechanism and structured according to the message format to each microservice for which the one or more output types of the annotation matches the output type most recently added to the stack of the third field (i.e. the output type in the "top" stack position or whichever stack position indicates most recently added).

In particular, the third field may specify types as an order in a stack, and the messaging mechanism is configured to distribute a message output to the messaging mechanism and structured according to the message format to each microservice for which the one or more output types of the annotation matches the output type most recently added to the stack of the third field.

Advantageously, the stack of the third field defines an order in which processing steps are to be performed (by reference to output types). A stack is an ordered list, in which list items are ordered according to chronology of insertion to the list.

Optionally, the controller of each microservice is configured, upon execution of the processing logic of the microservice, to output the output data.

The output data is generated by the microservice executing the processing logic. The data type of the output data may be fixed, that is, these is a single type of data output by the microservice, or the data type of the output data may be variable, that is, there is more than one type of data that may be output by the microservice. The annotation of the microservice specifies a single type of output data for fixed output data type, and more than one type of output data for variable output data type.

Furthermore, it may be that the output data is output, to the messaging mechanism, as a new message generated by the controller of the microservice and structured according to the messaging format. The new message includes: specification of the output data as the first field; a type of the output data generated by execution of the processing logic as the second field; the third field of the received message in response to which the processing logic was executed to generate the output data, from which the type of the output data generated by execution of the processing logic has been removed, as the third field.

Advantageously, once processing of data is initiated by a microservice, the particular output messaging protocol defined above contributes to the automated orchestration of microservices, by presenting the output data in a format in which it can be distributed to microservices able to generate the required output type, and in which the type of data to be input to the next microservice (i.e. the output of the microservice whose processing logic has just been executed) can be determined.

The new message may be linked to the original message (the message whose receipt triggered the execution of the processing logic), for example, by a common identifier.

Messages may specify data by expressly defining a data value or a tuple of data values. Alternatively, data may be specified by a reference or link to a storage location or another form of address from which the data is accessible. In particular, messages structured according to the messaging format express the first field as a URI (uniform resource indicator) or URL (uniform resource locator) from which the data being input is accessible.

Advantageously, exchanging locators for data, rather than data itself, reduces traffic in the messaging mechanism (in terms of amount of data being transferred). Therefore, the messaging mechanism and structure of embodiments, which use messages as a means of automating orchestration of microservices, is facilitated.

The apparatus provides a system of connectable microservices that are annotated in a manner which enables the automated orchestration of plural microservices to provide a required data processing service. Embodiments also provide a means (interface) for receiving data processing requests and outputting results.

The apparatus may further comprise a request interface, configured to receive a data processing request, and to extract from the data processing request: a first request parameter, the first request parameter specifying input data; a second request parameter, the second request parameter semantically expressing a concept instantiated by the specified input data of the first request parameter; and a third request parameter, the third request parameter semantically expressing one or more concepts to be instantiated by output data responsive to the received data processing request; the request interface being configured to generate a message structured according to the message format and to output the generated message to the messaging mechanism, the generated message comprising: the first request parameter as the first field; the second request parameter as the second field; and the third request parameter as the third field.

The request may be configured so that requests are constrained to including types from the stored list of types as the second and third request parameters. The request interface may be, for example, an application programming interface (API) or a graphical user interface. The request interface generates message structured according to the message format and containing data extracted from the received request. Of course, the request interface may be configured so that the format of received requests is the same as or close to the message format, so that minimal processing is required to generate the message, which is distributed via the messaging mechanism. In other words, the request interface may simply route external requests, which already accede to the message format, to the messaging mechanism, optionally adding a request ID as a fourth field.

As a procedure for tracking jobs/tasks in the apparatus, the request interface may be configured to assign a reference ID to the received data processing request; the message format including a fourth field identifying a data processing request in association with which the message is generated; and the request receiver is configured to include in the generated message the assigned reference ID as the fourth field; wherein, the controller of each microservice is configured to include in the new message generated upon execution of the processing logic of the microservice, as the fourth field, a copy of the fourth field of the received message in response to which said execution of the processing logic was performed.

It is noted that the controller of each microservice is configured to leave the fourth field unchanged in modifying the message.

The assignment of a reference ID which identifies received requests from one another (i.e. a unique request identifier) provides a means to link messages generated in connection with the same data processing request. For example, the presence in the system of data satisfying the data processing request can be detected and output by virtue messages all identifying the data processing request in relation to which they are generated.

Embodiments of another aspect of the embodiments include a microservice-based data processing method, comprising: storing a list of types, a type being a semantic expression of a concept instantiated by data in the apparatus; storing, for each of a plurality of microservices: an annotation of an input type from the stored list of types and one or more output types from the stored list of types; processing logic which, when executed, transforms input data instantiating the concept semantically expressed by the input type into output data instantiating the concept semantically expressed by one of the one or more output types. The method further comprises inputting data, via a message, to a microservice among the plurality of microservices, the message structured according to a message format. The message format includes: a first field specifying the data being input; and a second field specifying a type, from the stored list of types, semantically expressing the concept instantiated by the data of the first field. The method further comprises, at the microservice among the plurality of microservices: receiving the message from the messaging mechanism structured according to the messaging format, and responding by executing the processing logic of the microservice on condition of the type specified by the second field of the received message matching the input type of the annotation of the microservice.

Embodiments of another aspect include a computer program which, when executed by a computing apparatus, causes the computing apparatus to function as an apparatus defined above as an embodiment.

Embodiments of another aspect include a computer program which, when executed by a computing apparatus, causes the computing apparatus to perform a method defined above or elsewhere in this document as an embodiment.

Furthermore, embodiments include a computer program or suite of computer programs, which, when executed by a plurality of interconnected computing devices, cause the plurality of interconnected computing devices to perform a method embodiment.

Embodiments also include a computer program or suite of computer programs, which, when executed by a plurality of interconnected computing devices, cause the plurality of interconnected computing devices to function as a computing apparatus defined above or elsewhere in this document as an embodiment.

BRIEF DESCRIPTION OF THE DRAWINGS

Preferred features of the embodiments will now be described, purely by way of example, with reference to the accompanying drawings, in which.

DETAILED DESCRIPTION

Figure 1:
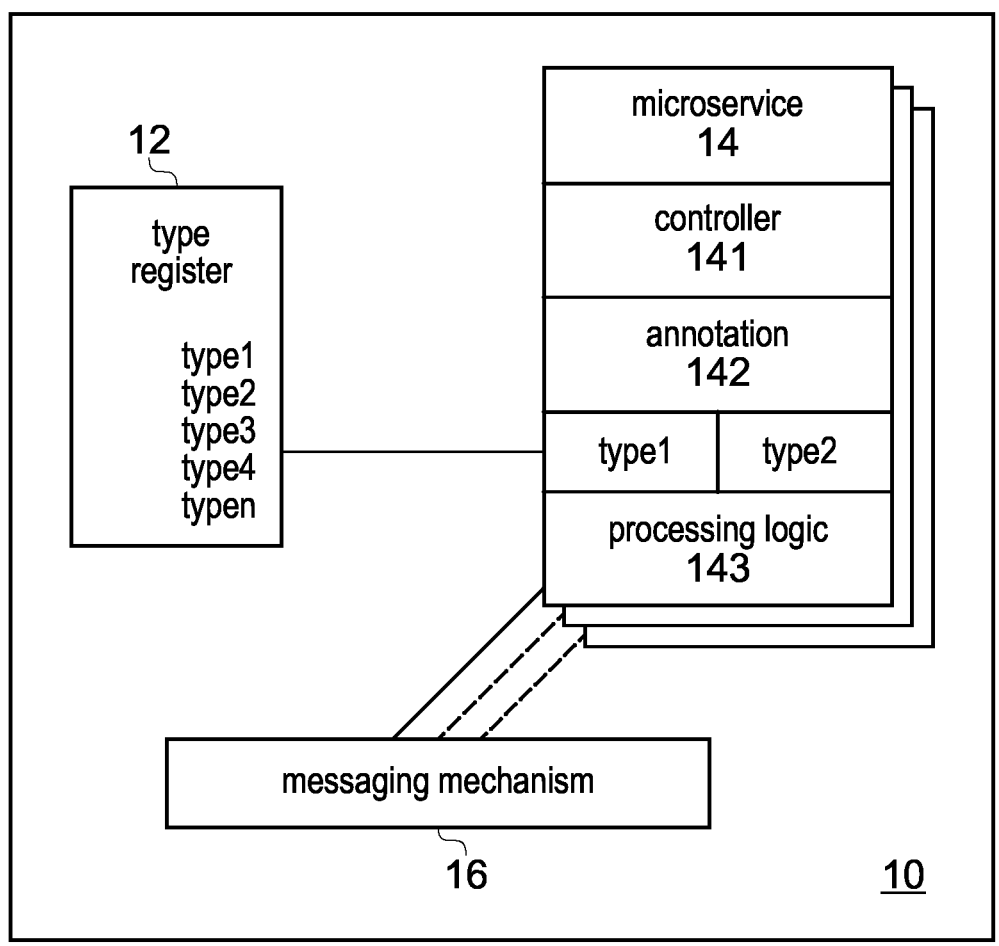
FIG. 1 is a schematic illustration of an apparatus embodiment.

Reference will now be made in detail to the embodiments, examples of which are illustrated in the accompanying drawings, wherein like reference numerals refer to the like elements throughout. The embodiments are described below by referring to the figures.

FIG. 1 is a schematic illustration of a microservice-based data processing apparatus 10. The apparatus 10 comprises a type register 12, a messaging mechanism 16, and a plurality of microservices 14. Each microservice 14 comprises a controller 141, an annotation 142, and processing logic 143. The microservices 14 can exchange data by transmitting messages via the messaging mechanism 16, indicated by the interconnections between the microservices 14 and the messaging mechanism 16. The annotations 142 of the microservices 14 are constrained by the content of the type register 12, indicated by the interconnection between the microservice 14 and the type register 12.

The type register 12 stores a list of types. A type is a semantic expression of a concept instantiated by data in the apparatus. Data in the apparatus means data forming the input to, or output from, a microservice 14 among the plurality of microservices. In other words, data processed by the plurality of microservices. A semantic expression is a word or phrase that represents a concept. Data instantiates a concept by being or representing an instance of the concept. For example, data may be a value or range or values defining a property (the concept). Each time a new microservice is added to the plurality of microservices, either the new microservice specifies existing types from the stored list of types 12 as the annotation of the input data and output data, or the types semantically expressing the input data and output data in the annotation of the new microservice are added to the stored list of types.

The type register 12 may be provided by a data storage unit, and in addition to data storage capability may also include a management function via which the content of the stored list of types can be queried.

The apparatus 10 comprises a plurality of microservices 14. Microservices 14 are a specific type of modular data processing architecture. Each microservice 14 is a single function/responsibility service. Microservices 14 can be orchestrated to execute in a particular order, the output of one forming the input of another, in order to realize a composite of the single functions/responsibilities.

The processing logic 143 is the data processing element of the microservice 14. The processing logic component 143 may also comprise a processor on which the logic is executed.

The annotation 142 publishes to other microservices 14 (via the messaging mechanism 16) the single function provided by the microservice 14, expressed in semantic terms representing a type of the input data to the processing logic 143, and one or more types of output data generated by the processing logic 143 in response to receiving said input data. The semantic expressions included in the annotation 142 are constrained by the membership of the list stored by the type register 12.

The controller 141 uses the annotation 142 to determine how to respond to incoming data. Data is received at the microservice 14 via the messaging mechanism 16. Messages received via the messaging mechanism 16 are effectively requests for a data processing service to generate data of a type specified by the message.

The controller 141, upon receiving a message specifying a type (from the stored list of types) of output data that matches the type of output data specified by the annotation 142 of the microservice 14, checks whether a specified type of data available for processing (i.e. data that the message is requesting be processed) matches the type of input data specified by the annotation 142. If so, the controller 141 triggers the microservice 14 to execute the processing logic 143 (for example, on a CPU). If not, the controller 141 generates a modified message for output to the messaging mechanism 16, requesting a microservice generate (as an output) data of the input type specified by the annotation 142, using (as an input) the data available for processing specified by the received message.

The messaging mechanism 16 is, for example, a service bus. The messaging mechanism 16 specifies a message format according to which messages are structured. Microservices 14 do not address messages to one another, i.e. it is not necessary in the design of a microservice to have any awareness of other microservices. Microservices 14 (via the controller 141) output messages structured according to the message format to the messaging mechanism 16. The messaging mechanism 16 distributes messages. The distribution mechanism may be conceptualized as a subscription-based system. Each message specifies one or more types (from the stored list of types) of data requested to be output (generated). Each microservice 14 is annotated with one or more types of the output data that the respective microservice generates. The output types of the annotations 142 effectively serve as subscriptions—each microservice 14 receives messages for which one of the one or more specified output types matches one of the one or more output types of the annotation 142 of the microservice 14.

Figure 2:
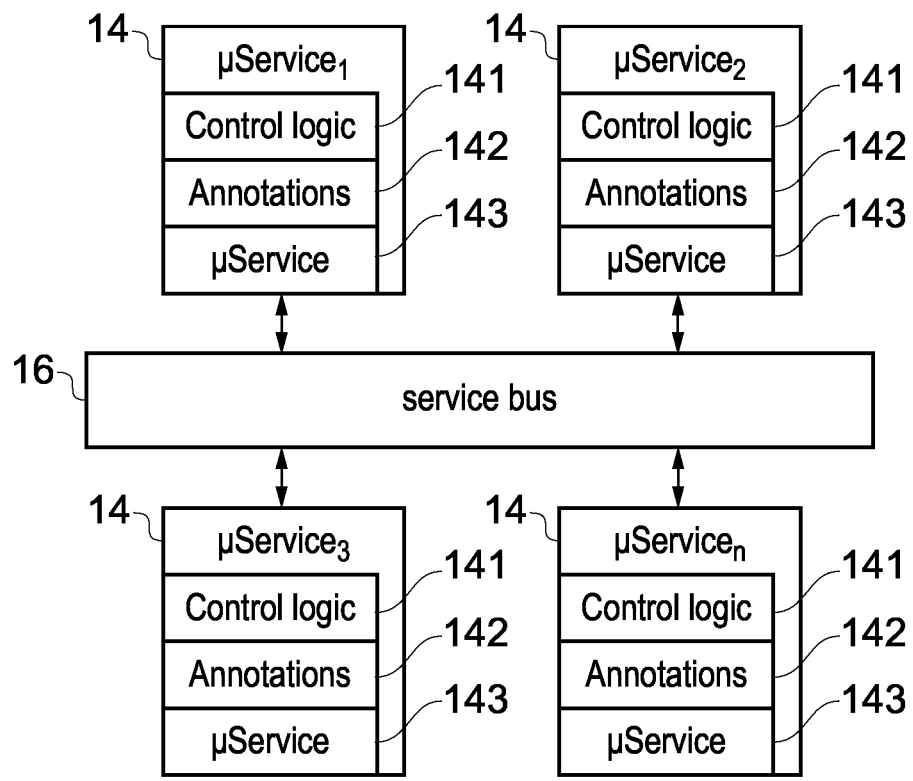
FIG. 2 is a schematic illustration of microservices in an embodiment.

FIG. 2 illustrates a plurality of interconnected microservices 14 in an embodiment. Each microservice 14 comprises:

control logic 141, exemplary of the controller mentioned elsewhere in this document;

annotations 142, exemplary of the annotation mentioned elsewhere in this document;

microservice 143, exemplary of the processing logic mentioned elsewhere in this document.

The service bus 16 is exemplary of the messaging mechanism mentioned elsewhere in this document.

The microservice 143 is a data processor, that is, programmed hardware which executes instructions or processing logic to realize a particular function. The microservice 143 is extended with the additional elements: annotations 142 & control logic 141.

The service bus 16 is a messaging mechanism to which messages are output by the microservices 14 for distribution. Microservices 14 need only be configured to communicate with the service bus 16, rather than with other microservices 14. In this way, each microservice 14 need not be reconfigured following the addition/deletion of microservices 14 from the apparatus.

The control logic 141 contains common operations across all microservices 14 in the apparatus. Messages from the service bus 16 are received by the control logic 141 and processed.

Figure 3:
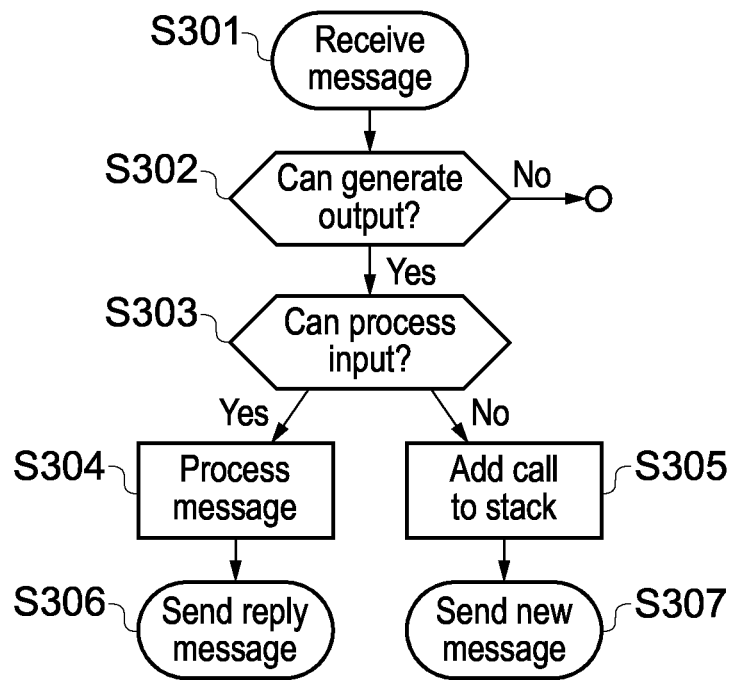
FIG. 3 illustrates a flow of control in a microservice of an embodiment.

FIG. 3 sets out an exemplary flow of processing carried out by the control logic 141.

The control logic 141 is a common operation across all of the microservices 14. The control logic 141 determines how a message received by the microservice 14 from the service bus 16 is processed. The outcome of the logic in a particular execution is dependent upon the content of the message being processed and the annotation 142 of the microservice 14.

The annotations 142 define a number of types that encapsulate the semantics of the inputs and outputs of the respective microservice. For example, many entities will be represented in the apparatus by string objects. However, the types defined by the annotations 142 are not a reference to a type in terms of the form of the data (such as string/number/tuple), but are in fact a semantic expression of a concept instantiated by data in the apparatus. For instance, types may include: "title name", "person name", "address", "name", "location", "time". The annotation 142 of a microservice 14 includes at least an input type, defining a type (from the stored list of types) of data on which the microservice 143 is operable, and one or more output types, defining a type (from the stored list of types) of data produced by execution of the microservice 143.

The service bus 16 distributes messages according to the type defining output data of a microservice 14. Each message includes a field (third field) defining a type of output data sought by the message (a message effectively being a processing request). Optionally, the service bus 16 distributes each message to each microservice 14, and the control logic 141 of the respective microservice 14, upon receiving the message at step S301, determines at S302 whether or not the respective microservice 14 can generate the type of output data sought by the message, based on the type of output data defined in the annotation 142. For example, the third field may be a stack of output types (a stack being a bag or list or container that preserves an order in which types are added), with the control logic of the respective microserivce 14, upon receiving the message at step S301, determining at step S302 whether or not the respective microservice 14 can generate the type of output data defined by the type in the position within the stack denoting most-recently added, based on the type of output data defined in the annotation 142. As an alternative implementation, it may be that a subscription service operated by the service bus 16 only distributes a message to microservices 14 for which the annotations 142 indicate that an output type produced by the respective microservice 14 matches the type of output data sought by the message, the type of output data sought by the message being indicated by the type most recently added to the stack, as indicated by position within the stack. For example, each type stored in a stored list of types (not illustrated) has a corresponding topic. Microservices 14 that produce output data of the type corresponding to the topic "subscribe" to the topic, and hence receive messages that specify an output type corresponding to the subscribed to topic.

Messages specify data that is to be processed (in a first field), for example, by a URL or other reference to the data. Messages specify (in a second field) a type of the data specified by the first field, the specified type being from the stored list of types. Messages specify (in a third field) one or more types (from the stored list of types) of data sought as an output, in an order defined by a stack. Messages may also include a fourth field identifying an interaction with the apparatus 10 or system containing the microservices 14, that is, identifying a specific processing request made of the apparatus 10 or system.

If one of the one or more output types that is specified by the annotation 142 of the microservice 14 does not match the output type in the stack position denoting most recently added, then the outcome of the control logic 141 is no at step S302, and no further processing occurs at the microservice 14 in relation to the received message. If one of the one or more output types that is specified by the annotation 142 of the microservice 14 does match the output types specified by the stack position of the third field of the message denoting most recently added, then the outcome of the control logic 141 is yes at step S302, and the processing proceeds to step S303.

Effectively, S303 determines whether the microservice 14 can process the data specified by the (first field of the) message, or whether additional processing is to be requested. The additional processing orchestrates the execution of other microservices to generate data of a type that can be processed by the microservice 14 in question. At step S303, an input type specified by the message is compared with one or more input types specified by the annotation 142 of the microservice 14. If there is a match, then the microservice 14 can process the data specified by the message in order to generate output data of a type specified by the message (in the position of the stack of the third field indicating most recently added), so the flow proceeds to step S304 and the message is processed. If there is no match, then the microservice 14 cannot process the data specified by the message, and a modified message is generated at step S305.

At step S304, the microservice 14 accesses the data specified by the message, executes its processing function, and generates a new message containing the output. The new message inherits the output type (third field) and interaction ID (fourth field) of the received message. The inherited output type is modified by the removal from the stack of the output type generated by the executed processing function. The first field of the new message specifies the data generated by the processing of step S304, and the second field specifies a type of said data. At step S306, the new message is output to the service bus 16.

At step S305, the received message is modified and re-circulated via the service bus, in order to find a microservice that can provide the required type of input. It can be appreciated that the procedure is iterative, so that a chain of microservices can be orchestrated in this manner. The modified message is the same as the received message, with the exception of the third field, specifying the type of output sought by the message. The input type specified by the annotation 142 of the microservice 14 is added to the stack of the third field, and occupies the stack position indicating most recently added, so that the new message seeks a microservice to generate an output of a type that can serve as an input (and also specifies the one or more output types previously sought in an order defined by the stack). At step S307 the modified message is output to the service bus 16.

A worked example is now detailed. A microservice 14 has an annotation 142 including the following information: IncomingMeetingAgreement→MeetingConfirmation, in which "IncomingMeetingAgreement" is the specified input type and "MeetingConfirmation" is the specified output type. In other words, the microservice 14 stores processing logic for transforming data instantiating a concept semantically expressed as "IncomingMeetingAgreement" into data instantiating a concept semantically expressed as "MeetingConfirmation".

The microservice 14 receives the following message:
(Msg 476 val:"Bowman" Name (MeetingConfirmation/Notification)). The first field is "Bowman", which is a value to be processed. The second field is "Name", which is the semantic expression of the concept instantiated by "Bowman" (i.e. the type of the value to be processed). The third field is "MeetingConfirmation/Notification", which is the requested types of microservice output requested. In addition, in this particular example, "Msg" indicates that the values correspond to a message. A fourth field, "476" is the ID of the processing request made to the apparatus giving rise to the message.

The microservice 14 can produce a "MeetingConfirmation", therefore it receives the message and/or answers "yes" at step S302 of the control logic 141. However, the microservice 14 processes "IncomingMeetingAgreement", which does not match "Name". Therefore, the answer at step S303 is "No", and a modified message is generated at step S305.

The new message seeks another microservice 14 to output data instantiating a concept semantically expressed by "IncomingMeetingAgreement". The modified message is as follows:
(Msg 476 val:"Bowman" Name (IncomingMeetingAgreement/MeetingConfirmation/Notification))

It can be seen that, relative to the original message, the input required by the microservice 14 has been added to the third field. In this manner, a stack of types is formed in the third field. Types are removed from the third field as processing is performed, and added to the third field as processing is requested.

Another microservice receives the message. The another microservice is annotated with "IncomingMeetingAgreement" as output type, and "Name" as input type, and hence the processing logic of the another microservice is executed on the data specified by the value "Bowman" of type "Name". The output data instantiates a concept semantically expressed by "IncomingMeetingAgreement", and specified by a reference.

The another microservice generates a new message as follows:
(Msg 476 ref:"4004" IncomingMeetingAgreement (MeetingConfirmation/Notification))

Where: Msg indicates that the values correspond to a message; 476 is the id of the interaction with the system (fourth field); Ref:"4004" is a reference to location of the value described by the message (first field); "IncomingMeetingAgreement" is the type of the value (second field); and "MeetingConfirmation/Notification" is the stack of requested output types, noting that "IncomingMeetingAgreement", which has now been successfully output, is removed from the third field.

The microservice 14 that first received the message in the worked example receives the message, and according to its annotation 142, can produce a "MeetingConfirmation", which matches the third field of the newly-received message. Furthermore, as indicated by the input type of the annotation, the microservice 14 can process an "IncomingMeetingAgreement", as specified by the second field of the message. Therefore, the processing logic 143 is executed on the "IncomingMeetingAgreement" specified by the first field.

A "MeetingConfirmation" (or, data instantiating a concept semantically expressed by "MeetingConfirmation") is output, and a new message is generated. The new message is as follows:

(Msg 476 ref:"1989" MeetingConfirmation (Notification))

In the new message, 476 is the id of the interaction with the system (fourth field); Ref:"1989" is a reference to location of the value described by the message (first field); "MeetingConfirmation" is the type of the value (second field); and "Notification" is the stack of requested output types, noting that "MeetingConfirmation", which has now been successfully output, is removed from the third field.

A further microservice annotated with "Notification" as output type, and "MeetingConfirmation" as input type generates and outputs a notification. The processing of the request is thus complete (which is detectable by the further microservice by the removal of the only remaining type from the third field). Depending on the implementation, a message may still be output by the further microservice, for example, with a null third field. The null third field would prevent the message being distributed to any microservice, but may indicate to, for example, a service log or other such entity, that processing of a request is complete. Optionally, no message is output by the microservice completing the processing, since the request has been satisfied, and there is no further processing.

Figure 4:
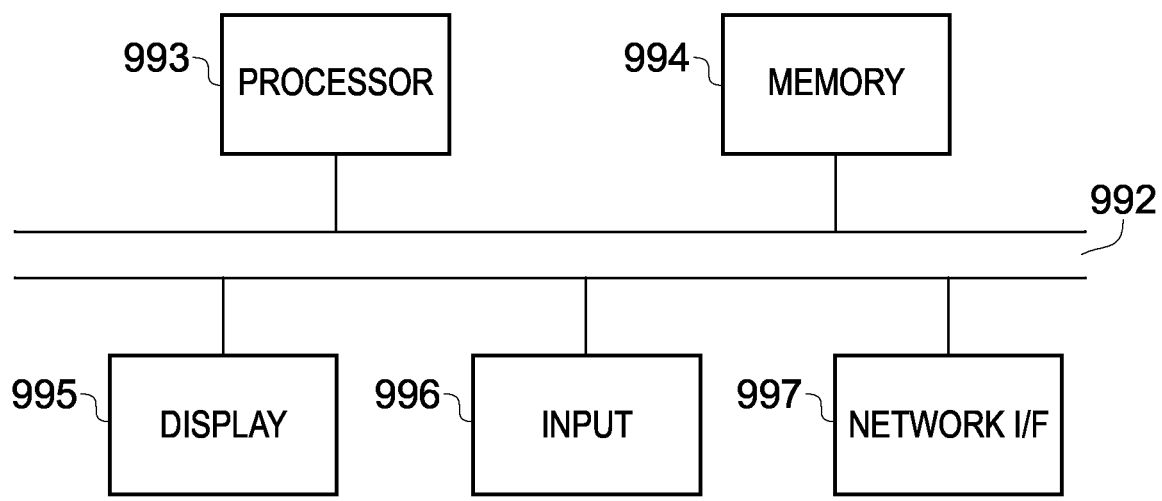
FIG. 4 illustrates a hardware configuration of an embodiment.

FIG. 4 illustrates a hardware configuration of an embodiment. FIG. 4 is a block diagram of a computing device, such as a web server, embodiment, and which may be used to implement a method of an embodiment. The computing device comprises a processor 993, and memory, 994. Optionally, the computing device also includes a network interface 997 for communication with other computing devices, for example with other computing devices embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of microservices described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The microservice-based data processing apparatus 10 of FIGS. 1 to 3 may be a processor 993 (or plurality thereof) executing processing instructions (a program) stored on a memory 994 and exchanging data via a network I/F 997. In particular, the processor 993 executes processing instructions to receive, via the network I/F, a data processing request from an external device and execute processing in accordance with the request, via the microservices. Furthermore, the processor 993 may execute processing instructions to store microservices 14 on a connected storage unit and/or to transmit, via the network I/F 997, messages to and from microservices, via the messaging mechanism 16, for processing.

The microservice 14 of FIGS. 1 to 3 may be a processor 993 (or plurality thereof) executing processing instructions (a program) stored on a memory 994 and exchanging data via a network I/F 997, wherein the network I/F implements functionality of the messaging mechanism 16. In particular, the processor 993 executes processing instructions to receive, via the network I/F, messages structured according to the message format from a request interface or other microservices, and process the received message via the controller 141 and processing logic 143. Furthermore, the processor 993 may execute processing instructions to store output data generated by the processing logic 143 on a connected storage unit and/or to transmit, via the network I/F, output data and/or a new or modified message to the messaging mechanism for distribution to other microservices.

Methods embodiments may be carried out on a computing device such as that illustrated in FIG. 4. Such a computing device need not have every component illustrated in FIG. 4, and may be composed of a subset of those components. A method embodiment may be carried out by a single computing device in communication with one or more data storage servers via a network. The computing device may be a data storage itself storing the microservices 14 and their respective output data.

A method embodiment may be carried out by a plurality of computing devices operating in cooperation with one another. One or more of the plurality of computing devices may be a data storage server storing at least a portion of the microservices 14 and their respective output data.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An apparatus of microservice-based data processing, the apparatus comprising:
   memory hardware which stores a type register, a list of types, a type being a semantic expression of a concept instantiated by data in the apparatus; and
   processor hardware, the memory hardware being coupled to the processor hardware,
   wherein the memory hardware stores a plurality of microservices, each microservice being executable by the processor hardware, and comprising:
      an annotation of an input type from the list of types and one or more output types from the list of types;
      processing logic which, when executed by the processor hardware, transforms input data instantiating the concept semantically expressed by the input type into output data instantiating the concept semantically expressed by at least one of the one or more output types;
   the memory hardware storing processing instructions which, when executed by the processor hardware, implement a messaging mechanism for inputting data, via a message, to a microservice among the plurality of microservices, the messaging mechanism defining a message format according to which messages are structured, the message format including:
      a first field specifying first field data being input,
      a second field specifying a concept type, from the list of types, semantically expressing the concept instantiated by the first field data of the first field, and
      a third field specifying the one or more output types, from the list of types, of requested output data,
   each microservice further comprising:
      a controller, the controller being configured to receive the message from the messaging mechanism structured according to the messaging format, and to respond by executing the processing logic of the microservice on condition of the concept type specified by the second field of the received message matches the input type of the annotation of the microservice,
   wherein the messaging mechanism is configured to distribute the message output to the messaging mechanism and structured according to the message format to each microservice for which one of the one or more output types of the annotation matches one of the one or more output types specified by the third field of the message; and
   wherein, the controller of each microservice is configured, on condition of the concept type specified by the second field of the received message not matching the input type of the annotation, to modify the message by adding the input type of the annotation of the microservice to the third field of the message, and to output a modified message for transmission via the messaging mechanism.

2. The apparatus according to claim 1, wherein, the third field specifies types as an order in a stack, and
   the messaging mechanism is configured to distribute the message output to the messaging mechanism and structured according to the message format to each microservice for which the one or more output types of the annotation matches the output type most recently added to the stack of the third field.

3. The apparatus according to claim 1, wherein
   the controller of each microservice is configured, upon execution of the processing logic of the microservice by the processor hardware, to output the output data.

4. The apparatus according to claim 3, wherein
   the output data is output, to the messaging mechanism, as a new message generated by the controller of the microservice and structured according to the messaging format, the new message including:
      specification of the output data as the first field;
      the type of the output data generated by execution of the processing logic as the second field;
      the third field of the received message in response to which the processing logic was executed to generate the output data, from which the type of the output data generated by execution of the processing logic has been removed, as the third field.

5. The apparatus according to claim 1, wherein
   messages structured according to the messaging format express the first field as a URL from which the data being input is accessible.

6. The apparatus according to claim 1, the memory hardware further storing processing instructions which, when executed by the processor hardware, implement a request interface, configured to receive a data processing request, and to extract from the data processing request:
   a first request parameter, the first request parameter specifying input data;
   a second request parameter, the second request parameter semantically expressing the concept instantiated by the input data specified of the first request parameter; and
   a third request parameter, the third request parameter semantically expressing one or more concepts to be instantiated by the output data responsive to the data processing request received;
   the request interface being configured to generate the message structured according to the message format and to output a generated message to the messaging mechanism, the generated message comprising:
      the first request parameter as the first field;
      the second request parameter as the second field; and
      the third request parameter as a third field.

7. The apparatus according to claim 4, wherein
the request interface is to assign a reference ID to the received data processing request;
the message format includes a fourth field identifying a data processing request in association with which the message is generated; and
the request receiver is to include in the generated message an assigned reference ID as the fourth field;
wherein, the controller of each microservice is to include in the new message generated upon execution of the processing logic of the microservice, as the fourth field, a copy of the fourth field of the message received in response to which execution of the processing logic was performed.

8. The apparatus according to claim 1, wherein the controller of each microservice is to leave the fourth field unchanged in modifying the message.

9. The apparatus according to claim 1, the memory hardware further storing processing instructions which, when executed by the processor hardware, implement a microservice manager,
the microservice manager to manage addition of new microservices to the plurality of microservices, and to receive and store on the memory hardware a new microservice for inclusion in the plurality of microservices, the new microservice being annotated with:
an input type, semantically expressing the concept instantiated by data processed by the new microservice when executed, and
an output type, semantically expressing the concept instantiated by a result of processing data by the new microservice,
the new microservice comprising:
processing logic which, when executed by the processor hardware, transforms input data instantiating the concept semantically expressed by the input type into output data instantiating the concept semantically expressed by the output type;
the microservice manager is further configured to:
add to the type register the input type and the output type with which the new microservice is annotated; and
add the microservice to the plurality of microservices.

10. The apparatus according to claim 1, wherein the microservice manager is further to manage removal of a microservice from the plurality of microservices on the memory hardware, managing removal of the microservice comprising:
provided the input type with which the microservice is annotated does not appear among the annotations of any of the remaining plurality of microservices, removing the input type from the list of types;
provided the output type with which the microservice is annotated does not appear among the annotations of any of the remaining plurality of microservices, removing the output type from the list of types; and
removing the microservice from the plurality of microservices on the memory hardware.

11. A microservice-based data processing method, comprising:
storing on memory hardware a list of types, a type being a semantic expression of a concept instantiated by data in the apparatus;
storing, on the memory hardware, a plurality of microservices, including, for each microservice:
an annotation of an input type from the list of types and one or more output types from the list of types;
processing logic which, when executed by processor hardware coupled to the memory hardware, transforms input data instantiating the concept semantically expressed by the input type into output data instantiating the concept semantically expressed by one of the one or more output types;
the method further comprising:
executing, on the processor hardware, the plurality of microservices, and inputting data, via a message, to a microservice among the plurality of microservices, the message structured according to a message format, the message format including:
a first field specifying data being input,
a second field specifying a concept type, from the list of types, semantically expressing the concept instantiated by the data of the first field, and
a third field specifying the one or more output types, from the list of types, of requested output data,
the method further comprising, at the microservice among the plurality of microservices:
receiving the message structured according to the message format, and responding by executing the processing logic of the microservice on condition of the concept type specified by the second field of the received message matching the input type of the annotation of the microservice,
wherein
the messaging mechanism is configured to distribute the message output to the messaging mechanism and structured according to the message format to each microservice for which one of the one or more output types of the annotation matches one of the one or more output types specified by the third field of the message; and
the controller of each microservice is configured, on condition of the concept type specified by the second field of the received message not matching the input type of the annotation, to modify the message by adding the input type of the annotation of the microservice to the third field of the message, and to output a modified message for transmission via the messaging mechanism.

12. A non-transitory computer-readable medium storing a computer program which, when executed by a computing apparatus, causes the computing apparatus to execute a microservice-based data processing method, comprising:
storing on memory hardware a list of types, a type being a semantic expression of a concept instantiated by data in the apparatus;
storing, on the memory hardware, a plurality of microservices, including, for each microservice:
an annotation of an input type from the list of types and one or more output types from the list of types;
processing logic which, when executed by processor hardware coupled to the memory hardware, transforms input data instantiating the concept semantically expressed by the input type into output data instantiating the concept semantically expressed by one of the one or more output types;
the method further comprising:
executing, on the processor hardware, the plurality of microservices, and inputting data, via a message, to a microservice among the plurality of microservices, the message structured according to a message format, the message format including:

a first field specifying data being input, a second field specifying a concept type, from the list of types, semantically expressing the concept instantiated by the data of the first field, and a third field specifying the one or more output types, from the list of types, of requested output data, the method further comprising, at the microservice among the plurality of microservices:

receiving the message structured according to the message format, and responding by executing the processing logic of the microservice on condition of the concept type specified by the second field of the received message matching the input type of the annotation of the microservice, wherein the messaging mechanism is configured to distribute the message output to the messaging mechanism and structured according to the message format to each microservice for which one of the one or more output types of the annotation matches one of the one or more output types specified by the third field of the message; and the controller of each microservice is configured, on condition of the concept type specified by the second field of the received message not matching the input type of the annotation, to modify the message by adding the input type of the annotation of the microservice to the third field of the message, and to output a modified message for transmission via the messaging mechanism.

* * * * *